United States Patent Office.

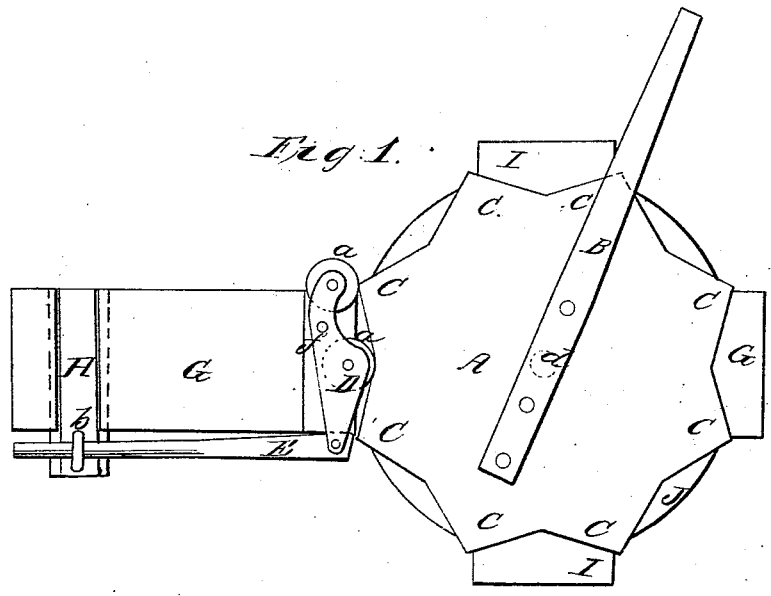
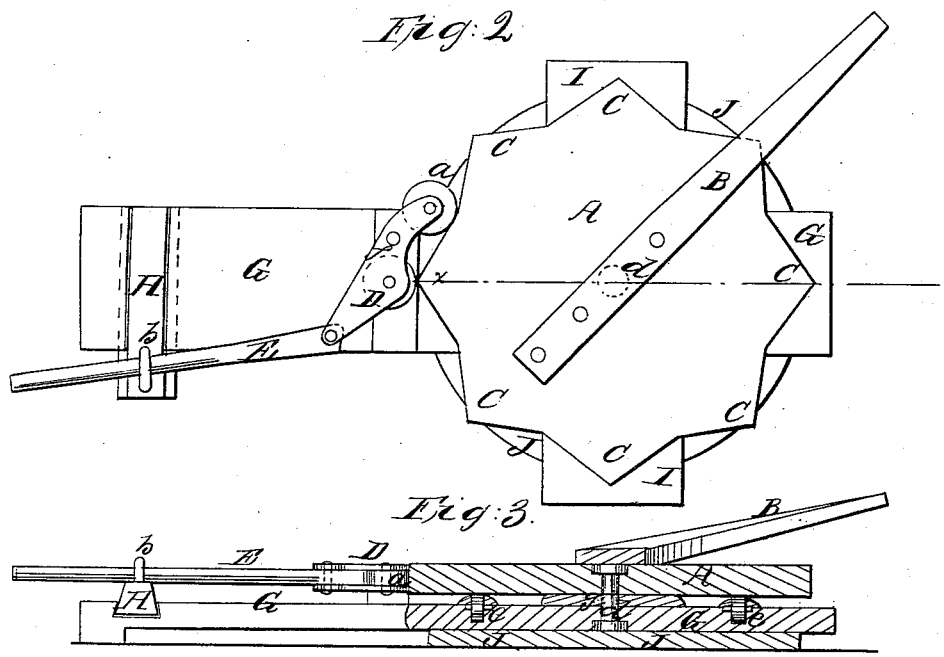

B. H. WILCOX, OF PETROLEUM CENTRE, PENNSYLVANIA.

Letters Patent No. 82,777, dated October 6, 1868.

IMPROVED HORSE-POWER.

The Schedule referred to in these Letters Patent and making part of the same.

TO ALL WHOM IT MAY CONCERN:

Be it known that I, B. H. WILCOX, of Petroleum Centre, in the county of Venango, and State of Pennsylvania, have invented a new and improved Horse-Power Machine; and I do hereby declare that the following is a full, clear, and exact description thereof, which will enable those skilled in the art to make and use the same, reference being had to the accompanying drawings, forming part of this specification, in which—

Figures 1 and 2 are plan views of my machine.

Figure 3 is a cross-section of the same, through the line $x \, x_1$ fig. 2.

Similar letters of reference indicate corresponding parts.

The object of this invention is to provide a simple and portable horse-power machine, for the purpose of sawing logs on the spot where the tree is felled, and for other purposes where a simple and cheap machine is required for the transmission of horse-power.

It consists, in general terms, of a cam-table, turned by a sweep-bar, the cams of the table vibrating the roller-lever as the table revolves.

The lever is connected with the saw or other mechanism by a rod.

In the accompanying plate of drawings, the cam-table is shown at A, B being the sweep-bar, to which the horse is hitched in the usual manner.

The perimeter of the table is formed with cam-profiles, as shown at C C C, &c., which impinge against the rollers $a \, a$ of the roller-lever D, which latter is pivoted at $f$ to the bed-timber G.

The cam-profiles are shown as angular projections, forming the perimeter of the table, but other modifications of the contour line of these cam-profiles may be devised, to suit the character of the work to be performed.

The rollers $a$ are pivoted within recesses formed in the roller-lever.

The connecting-rod E connects the lever with the saw or other mechanism.

The cam-table turns on the bolt $d$, and rests partially upon the central bars $g$ and partially upon the rollers $e \, e$, &c.

The cross-timber I, bed-timber, and plate J, form the foundation or bed-frame, upon which the cam-table revolves.

The connecting-rod plays through a guide, $b$, the said guide being affixed to the bar H, which latter slides within a dove-tailed slot across the bed-timber, as shown, for the purpose of permitting the adjustment of the rod E, and the saw attached thereto, to any small angle of operation, when, for any reason, it may be necessary to do so.

In practice, the perimeter of the cam-table, the lever D, and the rollers $a \, a$, are of metal, but the bed-frame may be made of hard wood.

This machine is light, durable, and effective, as has been proved by practical demonstration.

I claim as new, and desire to secure by Letters Patent—

The combination of the table A, having cam-profiles C, and mounted upon the cross-timber and plate J I, the pivoted lever D, rollers $a \, a$, connecting-rod E, dove-tailed slide H, and bed G, all constructed and arranged to operate as described, for the purpose specified.

B. H. WILCOX.

Witnesses:
 ISAIAH FORBES,
 J. A. MERRICK.